Inventor
JOHN S. ATTINELLO

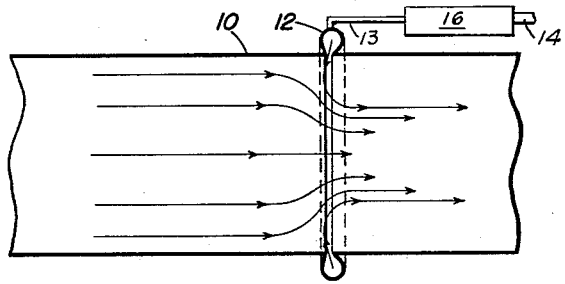
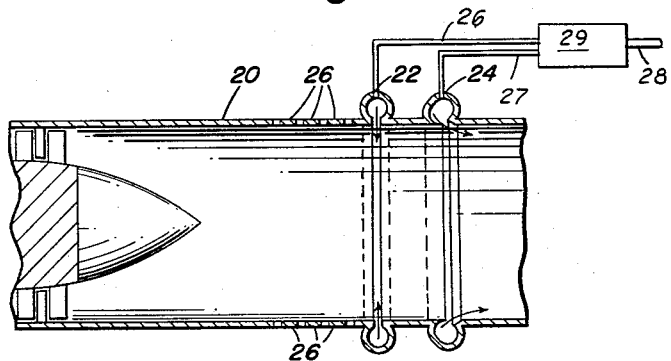
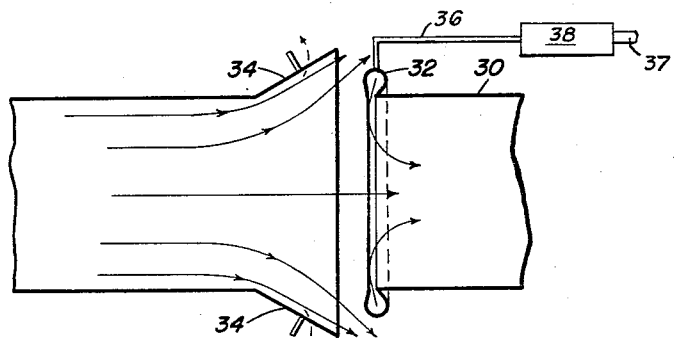
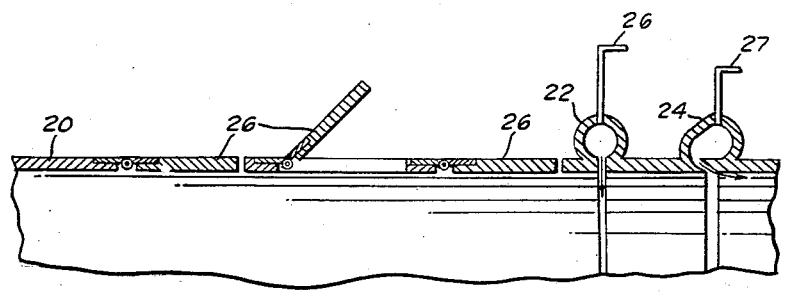

By R. J. Tompkin
Attorney

United States Patent Office 2,957,306
Patented Oct. 25, 1960

2,957,306

GAS JETS FOR CONTROLLING ENTRANCE AND/OR EXIT FLOW EFFECTIVE DIAMETER

John S. Attinello, Falls Church, Va.
(36 Apple Drive, Greencastle, Pa.)

Filed June 16, 1955, Ser. No. 516,054

5 Claims. (Cl. 60—35.6)

(Granted under Title 35, U.S. Code (1952), sec. 266)

The invention described herein may be manufactured and used by or for the Government of the United States of America for governmental purposes without the payment of any royalties thereon or therefor.

The present invention relates to a gas jet for controlling entrance and/or exit flow effective diameter, and more particularly to a gas jet which has the effect of either enlarging or decreasing the entrance or exit flow area of a gaseous stream, such as in a jet engine.

At the present time, jet engines are provided with mechanical means to control the effective diameter of a gas stream. These mechanical means take such forms as ramps, clamshell doors, etc., and are known to be complex mechanically, heavy, and of less efficiency than is desirable. Deterioration and failure of such means from high jet temperatures is also a problem.

The present invention provides for the effective increase or decrease in the diameter of a gas stream by injecting into the stream one or more jets of gas at high velocity. These injections of gas by determining the cross-section of the gas stream actually form the boundary of the gas stream and so may be described as creating a "fluid nozzle" or "air nozzle" which is infinitely variable.

It is therefore an object of the present invention to provide a light weight system for varying the effective diameter of a gas stream.

Another object is to provide means to vary the effective diameter of a gas stream by a relatively simple system, which will be therefore relatively trouble-free.

A further object of the invention is the provision of a system for varying the effective diameter of a gas stream with small loss of efficiency.

Figure 5:
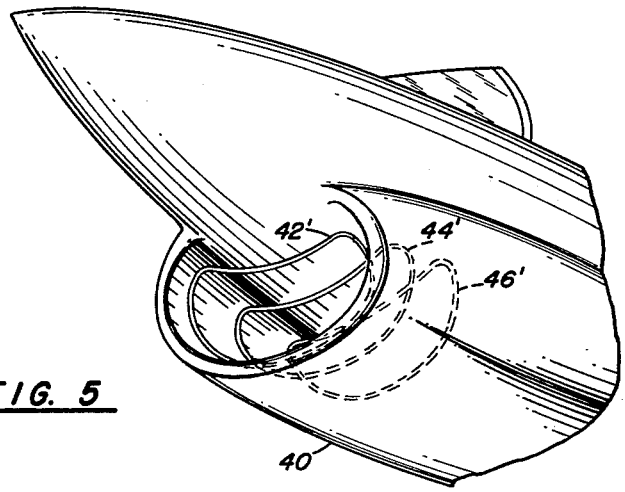
Figure 6:
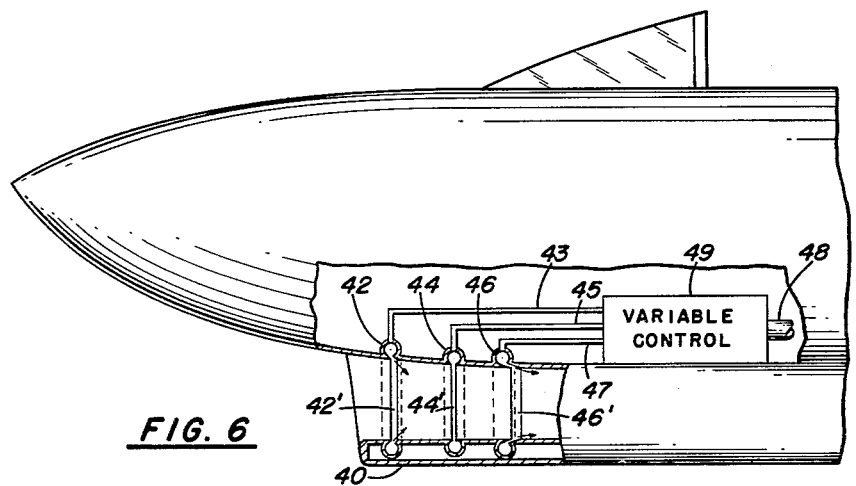

Other objects and many of the attendant advantages of this invention will be readily appreciated as the same becomes better understood by reference to the following detailed description when considered in connection with the accompanying drawings wherein:

Fig. 1 is a schematic view of the outlet of a jet engine embodying one aspect of the present invention, Fig. 2 is a cross-section of the outlet region of a jet engine having the present invention applied thereto, Fig. 3 is a schematic view of the outlet of a jet engine having another embodiment of the invention applied thereto, Fig. 4 is an enlarged view of a portion of Fig. 2 showing the pivoted panels thereof, Fig. 5 is an isometric view of an inlet duct to a jet engine having the invention applied thereto, and Fig. 6 is a side view of the aircraft of Fig. 5 showing a cutaway of the inlet duct.

Referring now to the drawings, wherein like reference characters designate like or corresponding parts throughout the several views, there is shown in Fig. 1 a jet engine tail pipe 10, through which hot, high-velocity gas is flowing, as represented by the flow lines. A tube 12 having openings facing into the interior of the tail pipe 10 is provided, the opening being so arranged that a blowing jet enters the tail pipe 10 from the tube 12 perpendicularly to the direction of stream flow, or at a slight angle to the perpendicular in the upstream direction. The blowing jet from the tube 12 serves to reduce the effective diameter of the main jet stream in the tail pipe 10 thereby forming the boundary of the main jet stream and creating an "air nozzle" of infinite variation, and to accomplish this smoothly and efficiently without danger of structural failures if high temperatures exist in the main stream. The gas used in the tube 12 is supplied through conduit 13 and supply pipe 14 with flow control being supplied by control valve 16, the gas prefferably being obtained from the compressor section of the jet engine, when the invention is applied to that type of engine. In this case, the blowing jet serves to cool the tail pipe 10, and it in turn is heated and is included in the exit stream to contribute to the engine thrust, thereby serving two purposes.

For supersonic flight, a convergent nozzle shape can be altered to a convergent-divergent shape with added engine efficiency by the application of this invention.

In Fig. 2 there is shown a tail pipe 20 of a jet engine, circumferentially around which are tubes 22 and 24. The tube 22 directs gas substantially radially inwardly, to provide an effective diameter reducing effect, as in the case of Fig. 1. A second tube 24 is so shaped and positioned that gas issues therefrom substantially parallel to the gas flow, and in the same direction. The effect produced by a high velocity gas jet issuing from tube 24 will be that of enlarging the effective diameter of the jet. The tubes 22 and 24 are connected to any convenient source of compressed gas by means of conduits 26, 27 and supply pipe 28, and may be operated either singly or jointly by means of control valve 29. By varying the admission of compressed gas to tubes 23 and 24 whereby adjustment can be made of the gas jets issuing from the tubes 22 and 24 (located as shown in Fig. 2) an infinite variation of convergent-divergent "fluid nozzle" configurations can be obtained. There may also be provided pivoted panels 26, ahead of the tube 22, the function of which is described below. Pivoted panels 26 are shown in greater detail in Fig. 4.

In Fig. 3 there is shown a tail pipe 30 having a tube 32 opening circumferentially thereinto, and pivoted panels 34 in the tail pipe 30, located upstream of the tube 32. Tube 32 directs high velocity gas into the tail pipe 30 perpendicularly to the main gas stream, or at a small angle against the stream, as shown. The gas used reaches tube 32 through conduit 36 and supply pipe 37, the control thereof being supplied by control valve 38. When the panels 34 are open while gas from the tube 32 issues into the tail pipe 30, the result will be as depicted by the flow lines; a mixture of gas from tube 32 with some of the main jet will issue out of the tail pipe, while a large amount of the main jet will be diverted through the openings provided by panels 34. There will thus occur a substantial reduction in the thrust resulting from the spoilage of the flow, and this without the disadvantage of thrust loss due to the pressure drop created by a physical mechanism in the jet stream, a normal penalty present at all flight speeds in known installations.

An inlet duct 40 is shown in Figs. 5 and 6, there being tubes 42, 44 and 46 located in a wall of the duct 40. Tube 42 is so positioned that the gas issues from slot 42' at a substantially 45° angle to the main jet stream, whereas gas issues from tube 44 through slot 44' perpendicularly to the main jet stream and issues from tube 46 through slot 46' tangentially to the main jet stream. Tube 46 and slot 46' are preferably so shaped that advantage is taken of the so called "Coanda Effect" of directing the jet by impinging it against a curved surface. As the blowing jet direction becomes more tangent to the flow direction, an action similar to distributed suction takes place; as the jet is directed more nearly vertically or against the stream direction of flow, a blunt-body effect is achieved. It will be apparent that where, as here, two or more tubes are used, an infinite combination of flow shapes may be obtained, with attendant advantages in effective area variation. The gas employed reaches tubes 42, 44 and 46 through conduits 43, 45, and 47 and supply pipe 48, the control of the flow to the individual tubes 42, 44, 46 being controlled by variable valve control 49.

Obviously many modifications and variations of the present invention are possible in the light of the above teachings. It is therefore to be understood that within the scope of the appended claims the invention may be practiced otherwise than as specifically described.

What is claimed is:

1. In a jet engine, an exhaust duct of substantially non-variable cross-section, means directing a gas stream through said duct, a first tube extending circumferentially about said duct, first passage means connecting the interior of said tube with the interior of said duct and extending radially of said duct, a second tube extending circumferentially about said duct downstream of said first tube, second passage means connecting the interior of said second tube with the interior of said duct, said latter mentioned passage means entering said duct parallel to and in the same direction as the gas stream flow in said duct, and means to selectively admit compressed gas in variable amounts to said tubes, whereby gas jets are directed from said tubes into the gas stream in said duct, said gas jets from said first and second passage means cooperating to produce alteration of the gas stream flow effectively creating a variety of convergent-divergent configurations of said gas stream.

2. The apparatus of claim 1, said first mentioned tube lying upstream of said second mentioned tube, and an opening in the wall of said duct upstream of said first mentioned tube, said opening having a panel moveable between a closing position and an opening position, whereby a thrust spoiling effect may be obtained.

3. In a jet engine, an exhaust duct, means directing a gas stream through said duct, a first conduit extending circumferentially about said duct, a second conduit extending circumferentially about said duct downstream of said first conduit, each of said conduits lying in a plane perpendicular to the longitudinal axis of said duct, means to selectively admit compressed fluid in variable amounts to said conduits, first communicating means located between the interior of said first conduit and the interior of said exhaust duct to direct said compressed fluid from said first conduit inwardly and radially of said duct to provide a reducing effect on the effective diameter of the gas stream flow in said duct, second communicating means located between the interior of said second conduit and the interior of said exhaust duct to direct said compressed fluid from said second conduit inwardly and substantially parallel to and in the same direction as the gas stream flow in said duct to provide an enlarging effect on the effective diameter of the gas stream flow in said duct, said first and second communicating means cooperating to produce alteration of the gas stream flow in said duct effectively creating a variety of convergent-divergent configurations confining said gas stream.

4. In a jet engine, conduit means for directing a high speed fluid stream therethrough, a first tube extending circumferentially about said conduit means, a second tube extending circumferentially about said conduit means downstream of said first tube, each of said tubes lying in a plane substantially perpendicular to the longitudinal axis of said conduit means, means to selectively admit compressed fluid in variable amounts to said tubes, first communicating means located between the interior of said first tube and the interior of said conduit means to direct said compressed fluid from said first tube inwardly and radially of said conduit means to provide a reducing effect on the effective diameter of the fluid stream flow in said conduit means, second communicating means located between the interior of said second tube and the interior of said conduit means to direct said compressed fluid from said second tube inwardly and substantially parallel to and in the same direction as the fluid stream flow in said conduit means to provide an enlarging effect on the effective diameter of the gas stream flow in said conduit means, said first and second communicating means cooperating to produce alteration of the fluid stream flow in said conduit means effectively creating a variety of fluid nozzle configurations confining said fluid stream.

5. In a jet engine, an inlet duct, a first tube extending circumferentially about said inlet duct, a second tube extending circumferentially about said inlet duct downstream of said first tube, each of said tubes lying in a plane substantially perpendicular to the longitudinal axis of said inlet duct, means to selectively admit compressed fluid in variable amounts to said tubes, first communicating means located between the interior of said first tube and the interior of said inlet duct to direct said compressed fluid from said first tube inwardly and radially of said inlet duct to provide a reducing effect on the effective diameter of the fluid stream flow in said inlet duct, second communicating means located between the interior of said second tube and the interior of said inlet duct to direct said compressed fluid from said second tube inwardly and substantially parallel to and in the same direction as the fluid stream flow in said inlet duct to provide an enlarging effect on the effective diameter of the gas stream flow in said inlet duct, said first and second communicating means cooperating to produce alteration of the fluid stream flow in said inlet duct effectively creating a variety of fluid nozzle configurations confining said fluid stream.

References Cited in the file of this patent

UNITED STATES PATENTS

| 340,237 | Nagel et al. | Apr. 20, 1886 |
| 1,493,753 | Koleroff | May 13, 1924 |
| 2,280,835 | Lysholm | Apr. 28, 1942 |
| 2,577,919 | Roy | Dec. 11, 1951 |
| 2,597,253 | Melchior | May 20, 1952 |
| 2,599,879 | Walker | June 10, 1952 |
| 2,628,473 | Frye | Feb. 17, 1953 |
| 2,812,636 | Kadosch et al. | Nov. 12, 1957 |

FOREIGN PATENTS

| 523,637 | Belgium | Nov. 14, 1953 |
| 1,020,287 | France | Nov. 12, 1952 |
| 1,030,483 | France | Mar. 11, 1953 |
| 1,064,301 | France | Dec. 23, 1953 |
| 1,083,706 | France | June 30, 1954 |
| 1,090,986 | France | Oct. 27, 1954 |
| 860,754 | Germany | Dec. 22, 1952 |
| 654,344 | Great Britain | June 13, 1951 |